United States Patent [19]

McAfee

[11] Patent Number: 4,989,627
[45] Date of Patent: Feb. 5, 1991

[54] THERMAL FUSE VALVE

[75] Inventor: David D. McAfee, Niles, Mich.

[73] Assignee: Allied-Signal Inc., Morristown, N.J.

[21] Appl. No.: 498,502

[22] Filed: Mar. 23, 1990

[51] Int. Cl.⁵ .............................................. F16K 17/38
[52] U.S. Cl. ................................... 137/72; 220/89.3
[58] Field of Search ................... 137/72, 74; 220/89.3; 152/516, 517

[56] References Cited

U.S. PATENT DOCUMENTS

| | | | |
|---|---|---|---|
| 1,925,007 | 8/1933 | Rowley | 169/42 |
| 3,138,406 | 6/1964 | Chamberlain | 301/6 |
| 3,157,219 | 11/1964 | Dimin et al. | 152/427 |
| 3,991,804 | 11/1976 | Wilson | 152/427 |
| 4,221,231 | 9/1980 | Harvey et al. | 137/72 |
| 4,314,596 | 2/1982 | Keresztes | 152/330 |
| 4,535,957 | 8/1985 | Bischoff et al. | 244/103 |
| 4,627,498 | 12/1986 | Aalto et al. | 169/42 |
| 4,628,953 | 12/1986 | Correll et al. | 137/74 |

Primary Examiner—Martin P. Schwadron
Assistant Examiner—Kevin L. Lee
Attorney, Agent, or Firm—Larry J. Palguta; Ken C. Decker

[57] ABSTRACT

The thermal fuse valve (10, 110) is disposed within a passage (14, 114) of the wheel rim (12, 112). The thermal fuse valve (10, 110) includes a retention mechanism (22, 122) which engages a complementary-shaped retention mechanism (13, 113) of the passage (14, 114) such that the thermal fuse valve (10, 110) is disposed stationary relative to the passage (14, 114). The thermal fuse valve (10, 110) comprises a fuse body (20, 120) joined with a sealing fuse plug (30, 130) by way of a fusible material (40, 140). The fuse body (20, 120) includes a central opening (24, 24A, 124) receiving an axial extension (34, 134) of said sealing plug (10, 110). A seal (50, 150) is disposed about the perimeter of the sealing fuse plug (30, 130) in order to retain pressurized fluid within the tire, the pressurized fluid communicating with the central opening (24, 24A, 124) and acting upon the extension (34, 134) of the sealing fuse plug (30, 130). An increase in temperature to a predetermined temperature causes the fusible material (40, 140) to melt and, in conjunction with the increased fluid pressure within the wheel, permits the sealing fuse plug (30, 130) to be released from the passage (14, 114) so that the pressurized fluid escapes through the central opening (24, 24A, 124).

11 Claims, 2 Drawing Sheets

THERMAL FUSE VALVE

The present invention relates generally to a thermal fuse valve for a vehicle wheel, and in particular to a thermal fuse valve for an aircraft wheel.

It is known that safety devices may be utilized on the wheels of an aircraft in order to prevent the pressure within the tires from rising to excessive pressures that can cause explosions. Such safety devices are illustrated in U.S. Pat. No. 3,269,402; 26,137; 4,365,643; and 4,628,953. These pressure rises can result from substantial braking when the aircraft cannot take off at the last moment, such rejected take-offs increasing considerably the temperature and hence the pressure of the fluid contained within the tires. Prior safety devices comprise, generally, bistable check valves wherein a valving means is held against its seat by a plug of eutectic material which melts at a certain temperature, and of which a molten part of the material is evacuated through orifices made in the head of the valve. Such devices do not always provide good results because the molten part of the eutectic material, as it passes through the orifices, solidifies at the level of the orifices and prevents any additional leakage or creep of the plug of eutectic. The consequence is that the valve does not have sufficient displacement to permit the necessary evacuation of the fluid pressure from within the tire, and the tire can then explode. It is desirable to provide a thermal fuse plug which solves the above problems, and which provides a simply manufactured and cost effective valve for an aircraft tire.

The present invention solves the above problems by providing a vehicle wheel having a rim with a tire attached thereto to define a pressure chamber for a fluid, and a thermal fuse valve connected with the pressure chamber through a passage in the rim, the thermal fuse valve comprising a fuse body joined with a sealing fuse plug by means of a fusible material, the fuse body including valve retention means for retaining said fuse body and sealing fuse plug relative to said passage, the passage including complementary-shaped retention means for cooperating with the valve retention means to retain the fuse body in a stationary position relative to said passage, the fuse body including a through opening communicating with said pressure chamber, the sealing plug comprising sealing means disposed thereabout and engaging sealingly the passage to prevent the escape of fluid from said pressure chamber, and an extension which extends into said through opening of the fuse body, the fusible material disposed about said extension and between the fuse body and sealing fuse plug to join the body and plug together, the fusible material having a melting point at a predetermined temperature such that an increase of temperature at the vehicle wheel to the predetermined temperature causes the fusible material to melt and, in conjunction with fluid pressure exerted against said extension, permits said sealing fuse plug to be released from being joined with said fuse body so that the plug is displaced and the sealing means disengages sealingly the passage and permits fluid to escape through said opening.

One way of carrying out the invention is described in detail below with reference to the drawings which illustrate embodiments in which.

Figure 1:
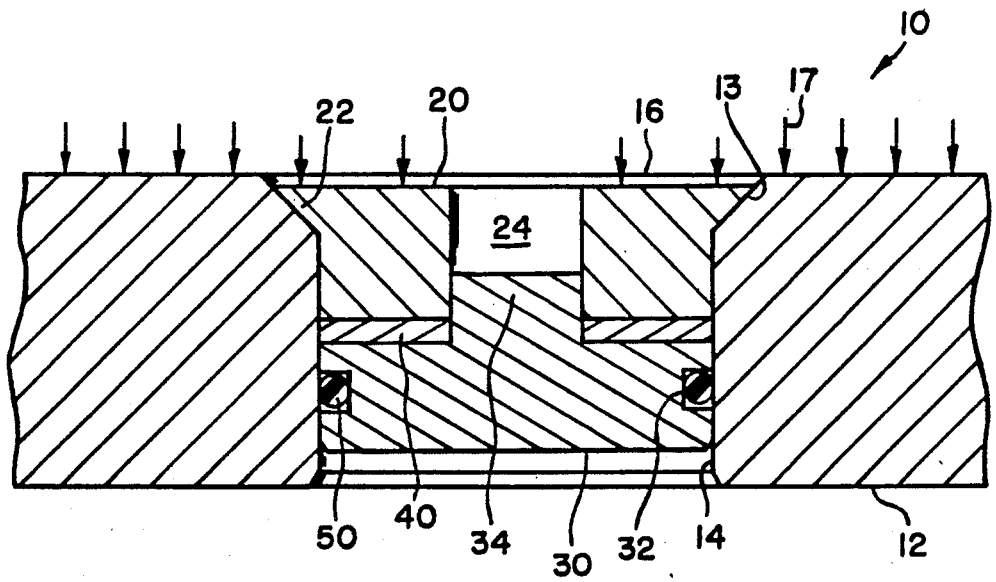
FIG. 1 is a section view of the thermal fuse valve of the present invention.
Figure 2:
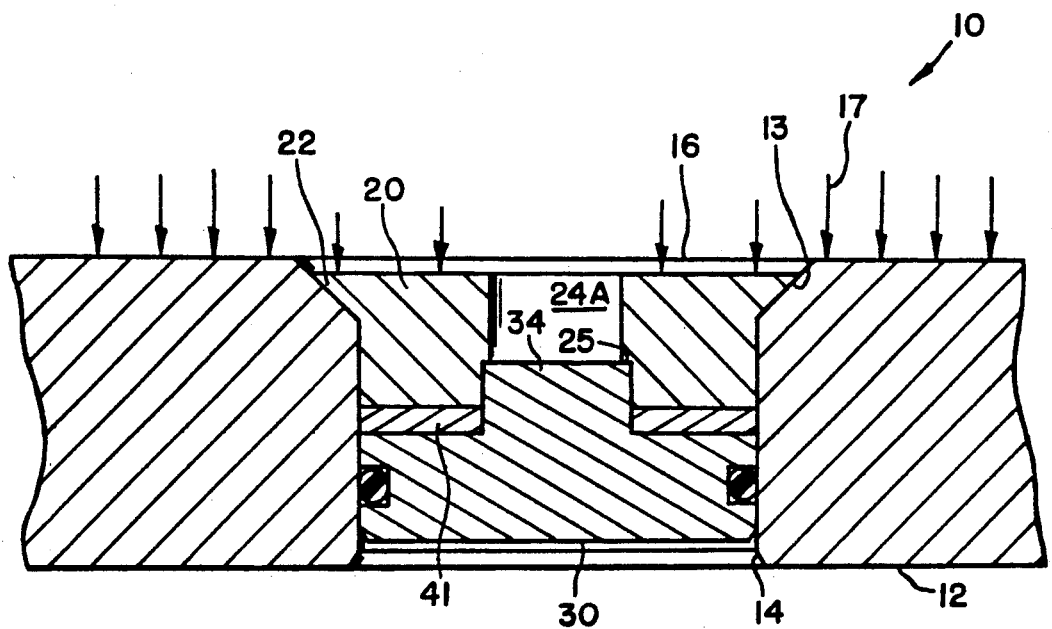
FIG. 2 illustrates a second embodiment of the thermal fuse valve of the present invention.

Referring to FIG. 1, the thermal fuse of the present invention is designated generally by reference numeral 10. Valve 10 is disposed within a wheel rim 12 which includes a through passage 14. Within wheel rim 12 is pressurized fluid, generally pressurized air or nitrogen, such that the interior of the tire comprises a pressurized vessel 16. The valve 10 comprises a fuse body 20 joined with a sealing fuse Plug 30 by means of a fusible material 40. Fuse body 20 engages the wheel rim 12 such that valve 10 cannot be expelled from passage 14. The fusible material 40 comprises a eutectic material which acts as a solder to join together the fuse body and sealing fuse plug while also including a predetermined melting point. Fuse body 20 includes an enlarged diameter section or retention means 22 which engages the retention means or enlarged diameter section 13 of passage 14. In FIG. 1, retention means 22 comprises a frustoconical surface which engages the complementary-shaped frustoconical surface comprising the retention means 13 of passage 14. The fluid pressure within vessel 16 is illustrated by arrows 17 which bias the frustoconical surface 22 into engagement with the complementary-shaped frustoconical surface 13 of rim 12. Fuse body 20 includes a central annular opening 24 communicating with the pressure vessel 16. The sealing fuse plug 30 includes a peripheral recess 32 which receives an O-ring or sealing means 50. Sealing means 50 engages the surface of passage 14 to prevent the escape of fluid pressure from vessel 16. Fuse body 20 allows pressurized fluid to pass around it or through central opening 24 such that the sealing means 50 is pressurized and engages sealingly the surface of passage 14. Sealing fuse plug 30 includes a central axial extension 34 which is shaped complementary with said opening 24. Axial extension 34 is received within central opening 24 such that it communicates with the pressurized fluid within pressurized vessel 16. The sealing plug 30 provides both an interior sealing surface for the sealing means 50 and a pilot mechanis 24/axial extension 34 which helps keep plug 30 centered both during assembly and during expulsion of the sealing fuse plug away from body 20. The fusible material 40 can vary as to its constituency, but is generally either a single element or a eutectic material having a defined melting point During normal operation, fluid pressure within vessel 16 tries to separate sealing fuse plug 30 from fuse body 20 but this is resisted by the bonding force of the fusible material 40. When the wheel temperature reaches or slightly exceeds the predefined melting point of the fusible material, the bonding force of the fusible material is reduced and allows the fluid pressure to separate the plug 30 from the body 20. During the melting of fusible material 40, sealing means 50 prevents pressurized fluid from leaking past sealing plug 30; such flow could cause the fusible material to resolidify and prevent separation. Upon separation of sealing fuse plug 30 from fuse body 20, sealing fuse plug 30 is expelled from passage 14 and fluid pressure in vessel 16 is released. Referring to FIG. 2, sealing fuse plug 30 and fuse body 20 have been altered slightly such that the central opening 24A is a stepped opening including a shoulder 25 so that axial extension 34 engages the shoulder 25. If the opening 24A and extension 34 are annular-shaped, the shoulder 25 would constitute a continuous stepped diameter section. Such a structure permits the fabrication of a fusible washer 41 of single element or eutectic material which fits between body 20 and plug 30. The entire assembly could, during the assembly procedure, be heated to the melt temperature of the fusible material during which the extension 34 would be pushed into opening 24A until the extension engages shoulder 25. Excess fusible material on the exterior of the valve could be removed after cooling of the assembly.

Figure 3:
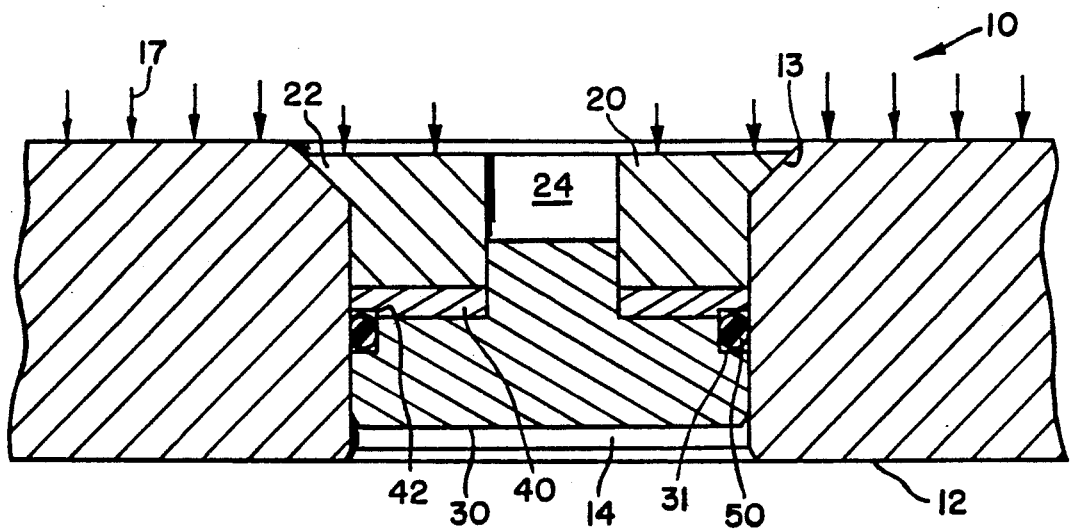
FIG. 3 is a section view of a third embodiment of the thermal fuse valve of the present invention.

Referring to FIG. 3, the thermal fuse valve 10 discussed above may be modified such that plug 30 includes an open recess 31 which communicates with an open recess 42 of fusible material 40. Thus, the O-ring or sealing means 50 engages sealingly the surface of passage 14 and the sealing plug 30 while also engaging a peripheral portion of fusible material 40.

Figure 4:
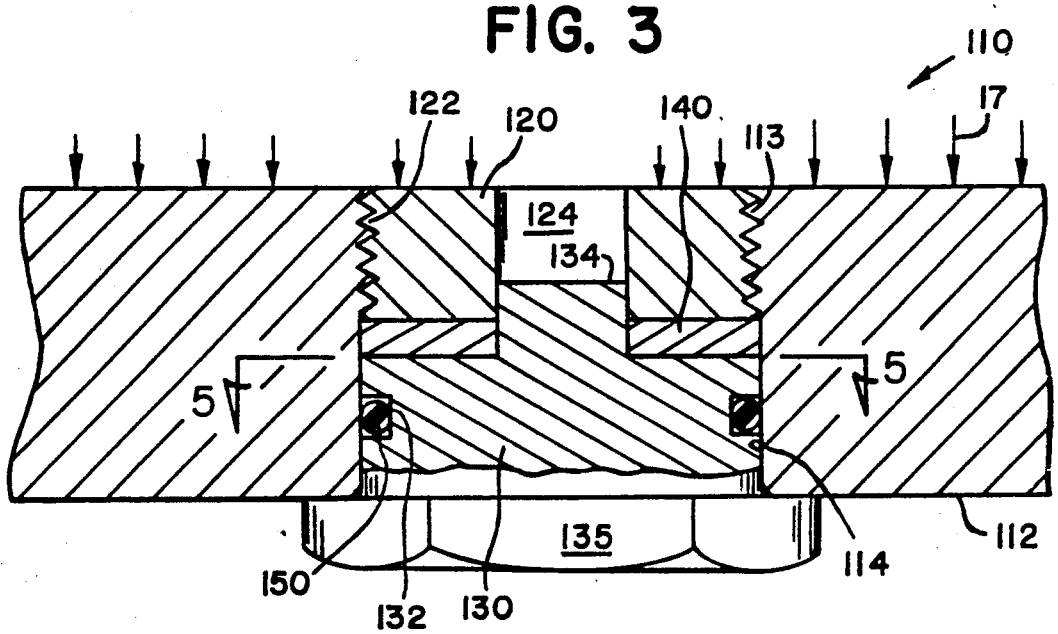
FIG. 4 is a section view of a fourth embodiment of the thermal fuse valve of the present invention.
Figure 5:
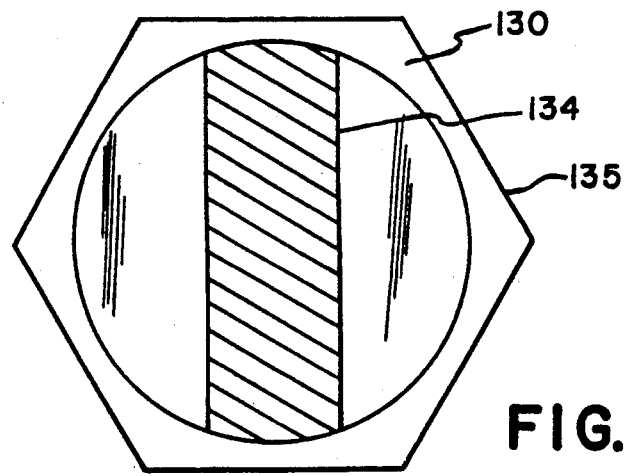
FIG. 5 is a section view taken along view lines 5—5 of FIG. 4.

Referring to FIG. 4, an alternative thermal fuse valve 110 comprises a fuse body 120 joined with a fuse plug 130 by means of a fusible material 140. Fuse body 120 includes threads 122 which mate with threads 113 of wheel rim 112. Fuse body 120 includes a central opening 124 which receives an axial extension 134 of body 30. Sealing means 150 is disposed within a recess 132 of body 130. The axial extension 134 comprises a generally non-annular extension as illustrated in FIG. 5. The opening 124 of body 120 comprises a complementary-shaped opening which receives extension 134 such that plug 130 and body 120 are coupled together rotatably. Should fusible material 140 not be strong enough to bond together body 120 and plug 130 when valve 110 is screwed into passage 114, axial extension 134 received within opening 124 couples together body 120 and 130 so that torque is transmitted from one member to the other. The plug 130 includes a enlarged diameter part 135 disposed adjacent rim 112 and which comprises the head of a nut so that valve 110 may be screwed into the passage 114. Thermal fuse 110 operates in the same manner as described for the above embodiments.

The thermal fuse valve of the present invention provides substantial advantages over prior valve devices. The valve provides a single part construction which, after assembly and solidification of the solder joint, can be inserted as a single member within the passage of the wheel rim. The valve does not rely upon the bond or solder joint effected by the fusible material in order to provide a sealing mechanism which retains pressure within the wheel. The O-ring or sealing means prevents pressurized fluid from leaking out of the tire without regard to whether or not the solder joint of the fusible material is fluid tight. The valve prevents any fluid leakage during melting of the fusible material. Previous single piece designs allowed the pressurized fluid to escape after only a partial melting of the fusible material. The escaping fluid would be of a lower temperature than the fusible material and thus would resolidify the fusible material and prevent the intended rapid deflation of the tire. The thermal fuse valve of the present invention prevents significant fluid flow past the fusible material until the sealing fuse plug is separated from the fuse body.

I claim:

1. In a vehicle wheel having a rim with a tire attached thereto to define a pressure chamber for a fluid, and a thermal fuse valve connected with the pressure chamber through a passage in the rim, the thermal fuse valve comprising a fuse body joined with a sealing fuse plug by means of a fusible material, the fuse body including valve retention means for retaining said fuse body and sealing fuse plug relative to said passage, the passage including complementary-shaped retention means for cooperating with the valve retention means to retain the fuse body in a stationary position relative to said passage, the fuse body including a through opening communicating with said pressure chamber, the sealing plug comprising sealing means disposed thereabout and engaging sealingly the passage to prevent the escape of fluid from said pressure chamber, and an extension which extends into said through opening of the fuse body, the fusible material disposed about said extension and between the fuse body and sealing fuse plug to join the body and plug together, the fusible material having a melting point at a predetermined temperature such that an increase of temperature at the vehicle wheel to the predetermined temperature causes the fusible material to melt and, in conjunction with fluid pressure exerted against said extension, permits said sealing fuse plug to be released from being joined with said fuse body so that the plug is displaced and the sealing means disengages sealingly the passage and permits fluid to escape through said opening.

2. The thermal fuse valve and vehicle wheel in accordance with claim 1, wherein said valve retention means comprises an enlarged diameter section, and said complementary-shaped retention means comprises an enlarged diameter section.

3. The thermal fuse valve and vehicle wheel in accordance with claim 2, wherein the enlarged diameter sections each comprise complementary-shaped frustoconical surfaces.

4. The thermal fuse valve and vehicle wheel in accordance with claim 1, wherein the valve retention means and complementary-shaped retention means comprise screw threads.

5. The thermal fuse valve and vehicle wheel in accordance with claim 4, wherein the opening within said fuse body comprises a non-annular shaped opening and the extension comprises an complementary-shaped extension so that rotation of said sealing fuse plug effects rotation of said fuse body.

6. The thermal fuse valve and vehicle wheel in accordance with claim 5, wherein said sealing fuse plug includes an enlarged diameter section disposed adjacent said rim and exterior to said passage.

7. The thermal fuse valve and vehicle wheel in accordance with claim 6, wherein said enlarged diameter section of the sealing fuse plug comprises a nut head.

8. The thermal fuse valve and vehicle wheel in accordance with claim 1, wherein said sealing fuse plug is annularly shaped and the plug is disposed entirely within said passage.

9. The thermal fuse valve and vehicle wheel in accordance with claim 8, wherein the fuse body is annularly shaped and the opening comprises a central annular opening.

10. The thermal fuse valve and vehicle wheel in accordance with claim 9, wherein the fusible material and sealing fuse plug comprise complementary-shaped recesses providing a seating recess for said sealing means.

11. The thermal fuse valve and vehicle wheel in accordance with claim 1, wherein the opening has a part with a smaller dimension than the dimension of the extension so that the extension may abut the part.

* * * * *